US010670948B2

(12) United States Patent
Chao et al.

(10) Patent No.: US 10,670,948 B2
(45) Date of Patent: Jun. 2, 2020

(54) SUSPENSION SYSTEM OF BIAXIAL OPTICAL ACTUATOR

(71) Applicant: Min Aik Technology Co., Ltd., Taoyuan (TW)

(72) Inventors: King-Sheng Chao, Taoyuan (TW); Shih-Po Yeh, Taoyuan (TW); Ching-Hsuan Chuang, Taoyuan (TW); Wei-Lung Lai, Taoyuan (TW)

(73) Assignee: MIN AIK TECHNOLOGY CO., LTD., Taoyuan (TW)

( * ) Notice: Subject to any disclaimer, the term of this patent is extended or adjusted under 35 U.S.C. 154(b) by 158 days.

(21) Appl. No.: 16/045,767

(22) Filed: Jul. 26, 2018

(65) Prior Publication Data

US 2020/0033704 A1    Jan. 30, 2020

(51) Int. Cl.
*G02B 27/64* (2006.01)
*G03B 21/14* (2006.01)
*H02K 33/00* (2006.01)

(52) U.S. Cl.
CPC .......... *G03B 21/142* (2013.01); *G02B 27/64* (2013.01); *H02K 33/00* (2013.01)

(58) Field of Classification Search
CPC ........ G02B 27/64; G02B 27/00; G02B 7/003; G02B 7/005; G02B 7/02; G02B 7/09; G02B 7/023; G03B 21/14; G03B 21/142; G03B 7/04; H02K 33/00
See application file for complete search history.

(56) References Cited

U.S. PATENT DOCUMENTS

| 5,774,266 | A * | 6/1998 | Otani | G02B 27/64 359/554 |
| 6,064,827 | A * | 5/2000 | Toyoda | G02B 27/646 396/55 |
| 7,502,554 | B2 * | 3/2009 | Enomoto | G03B 5/00 348/208.11 |
| 8,711,236 | B2 * | 4/2014 | Shimizu | H04N 5/2253 348/208.99 |
| 9,036,260 | B2 * | 5/2015 | Sugawara | G02B 7/08 359/557 |
| 2008/0259469 | A1 * | 10/2008 | Arai | G02B 7/02 359/819 |

(Continued)

*Primary Examiner* — William R Alexander
*Assistant Examiner* — Balram T Parbadia
(74) *Attorney, Agent, or Firm* — Leong C. Lei

(57) ABSTRACT

A suspension system of a biaxial optical actuator is provided, including a circuit-carrying base and an oscillation member, which is provided, in a center thereof, with an optical lens. An elastic suspension plate is coupled to the oscillation member and has four corners each forming an elastic unit that projects outside the oscillation member. The elastic units collaborate with support posts to support the elastic suspension plate and the oscillation member at a location above the base. The oscillation member is provided, on each of four sides thereof, with a magnetic device. The four magnetic devices is sequentially activated to apply a magnetic force such that the oscillation member together with the optical lens carried thereon to rotate about two imaginary axes of the elastic suspension plate respectively defined between each pair of two opposite magnetic devices to thereby serve as a rotation axes of the oscillation member.

13 Claims, 19 Drawing Sheets

(56) References Cited

U.S. PATENT DOCUMENTS

| | | | |
|---|---|---|---|
| 2011/0262121 A1* | 10/2011 | Yanagisawa | G02B 7/08 396/55 |
| 2011/0310501 A1* | 12/2011 | Min | G02B 7/022 359/824 |
| 2013/0194490 A1* | 8/2013 | Okuyama | G02B 7/04 348/374 |
| 2015/0261067 A1* | 9/2015 | Jung | H04N 5/23212 348/208.1 |
| 2016/0154205 A1* | 6/2016 | Min | G03B 5/00 |
| 2016/0161757 A1* | 6/2016 | Hee | G02B 27/646 359/557 |
| 2017/0017056 A1* | 1/2017 | Park | H02K 41/0356 |

* cited by examiner

SUSPENSION SYSTEM OF BIAXIAL OPTICAL ACTUATOR

TECHNICAL FIELD OF THE INVENTION

The present invention relates generally to a suspension system of a biaxial optical actuator, and more particularly to a suspension system of an optical actuator that is used in a projection apparatus and demonstrates characteristics of oscillation in two directions in order to make the oscillation of the actuator more stable and more accurate to thereby greatly improve the resolution and stability of image projection.

DESCRIPTION OF THE PRIOR ART

Advanced optical projection systems must meet the requirement of size compactness and good resolution of an image projected and also needs to have a low cost. Under such three conditions, designs of advanced optical projection systems, of which an example is illustrated in FIGS. 11 and 12, are such that an image of a microchip panel 92 (such as digital micromirror device (MDM)) travels through a prism 91, an actuator 80, and a lens 90 to be projected onto a curtain (not shown), wherein projection light, during travel, transmits through a lens arranged in the actuator 80 and, through fast repeated oscillation of the actuator 80 (to change the projection site), the location of the image is constantly changed to thereby achieve improvement of resolution.

A commonly adopted structure of the prior art actuator 80, which is shown in FIGS. 13, 14, and 15, comprises a base 81. The base 81 is formed with a mounting opening 801 in a central area thereof. On each of two opposite locations of the mounting opening 801, a bearing 82 and a rotary axle 83 are provided. An oscillation member 84 is arranged between the two rotary axles 83. The oscillation member 84 is made up of a carrier 841 and a lens 842 so that when the actuator is acted upon electromagnetically from a peripheral area thereof (not shown), the oscillation member 84 is caused to oscillate about an axial lines L1 defined between the two sets of bearing 82 and rotary axle 83, so that two opposite side portions of the oscillation member 84 are caused to regularly oscillate up and down in order to change the projection sites. This is the most commonly adopted solution.

The structure of the prior art actuator, however, suffers certain drawbacks, which have been described in U.S. patent application Ser. No. 15/415,891 and Chinese Patent Application No. 201611099292.4, which are owned by the present applicant and will not be described in detail herein. Such known structures, however, provide an oscillation mode that is a two-point support mode based on a single axial line L1. To further improve resolution, oscillation of light spots must be achieved with multiple-point oscillation in order to upgrade of the resolution of projection image. To provide multiple-point oscillation for an optical actuator, in addition to ingenious and elaborate structural arrangement, focus must be placed on accuracy and stability of multiple-point based movement of light spot. This is technically difficult, if not impossible, and has long been an issue need to be overcome in this field.

SUMMARY OF THE INVENTION

An objective of the present invention is such that a circuit-carrying base and an oscillation member are included. The oscillation member is provided, in a center thereof, with an optical lens. An elastic suspension plate is coupled to the oscillation member and has four corners each forming an elastic unit that projects outside the oscillation member. The elastic units collaborate with support posts to support the elastic suspension plate and the oscillation member at a location above the base. The oscillation member is provided, on each of four sides thereof, with a magnetic device. The four magnetic devices is sequentially activated to apply a magnetic force such that the oscillation member together with the optical lens carried thereon to rotate about two imaginary axes of the elastic suspension plate respectively defined between each pair of two opposite magnetic devices to thereby serve as a rotation axes of the oscillation member, so that the oscillation member may undergo oscillation of high accuracy at fixed time interval to allow projection light to form light spots at four different locations and thus, projection resolution can be greatly improved. Compared to the conventional two-light-spot mode optical actuator, the resolution of the present invention is greatly enhanced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
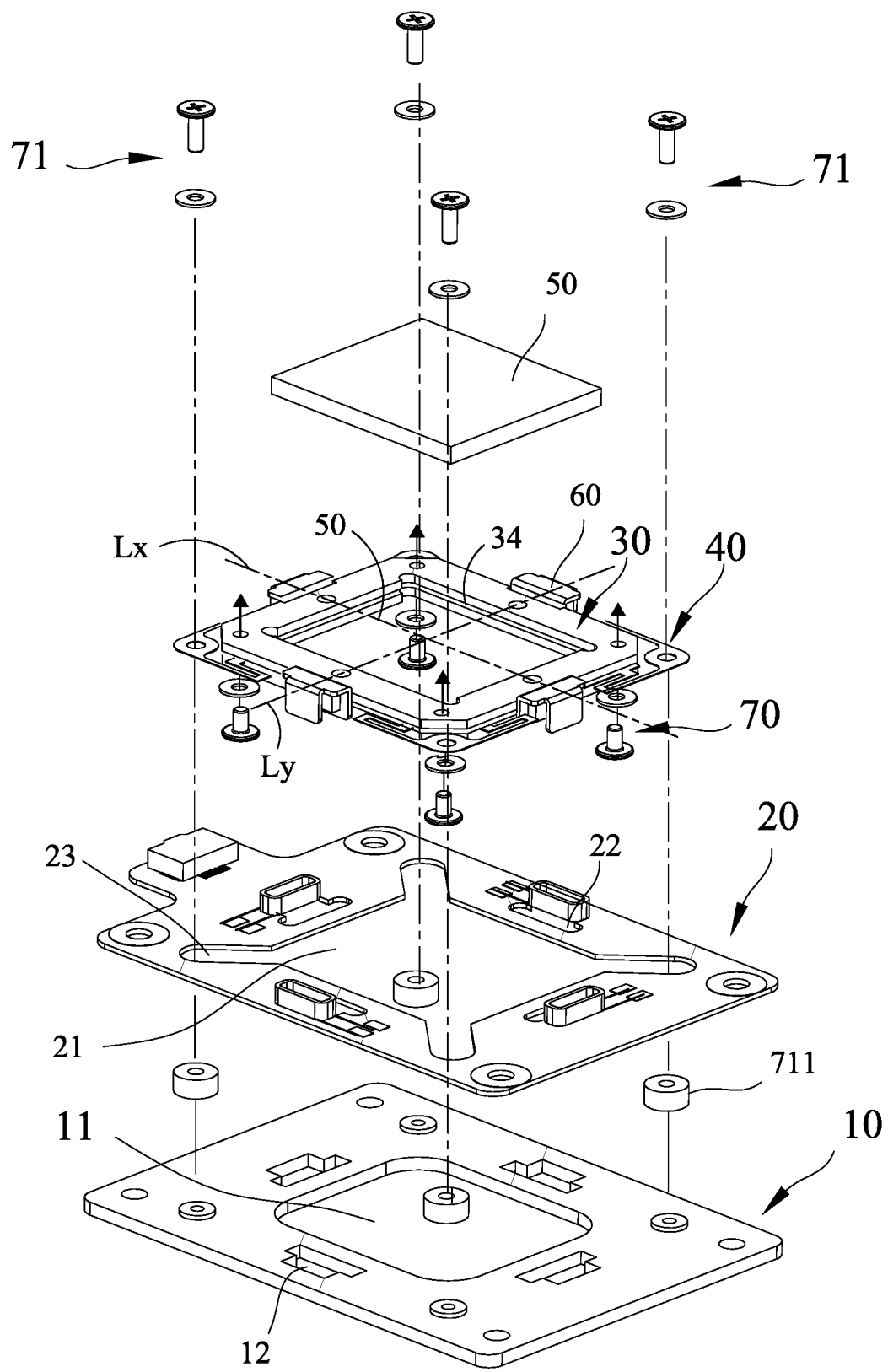
FIG. 1 is an exploded view illustrating an example of application of the present invention.
Figure 2:
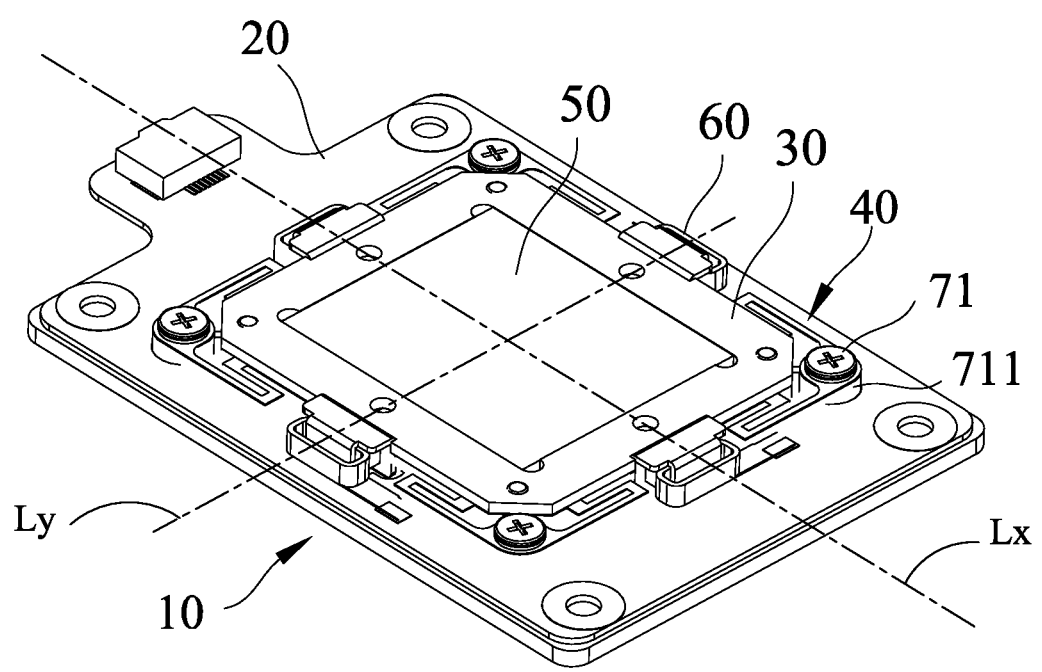
FIG. 2 is a perspective view, in an assembled form, illustrating the example of application of the present invention.
Figure 3:
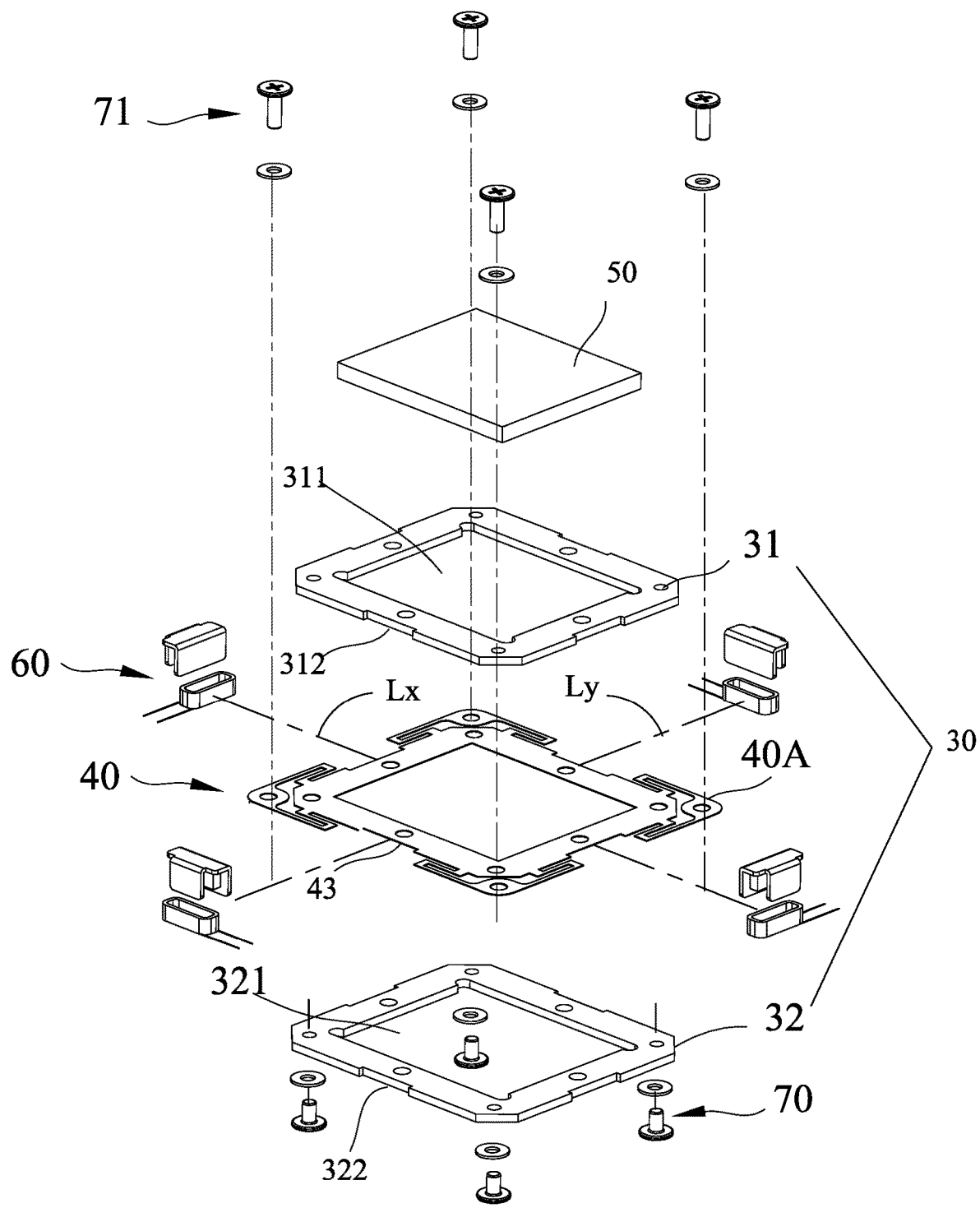
FIG. 3 is an exploded view of a suspension system according to the present invention.
Figure 4:
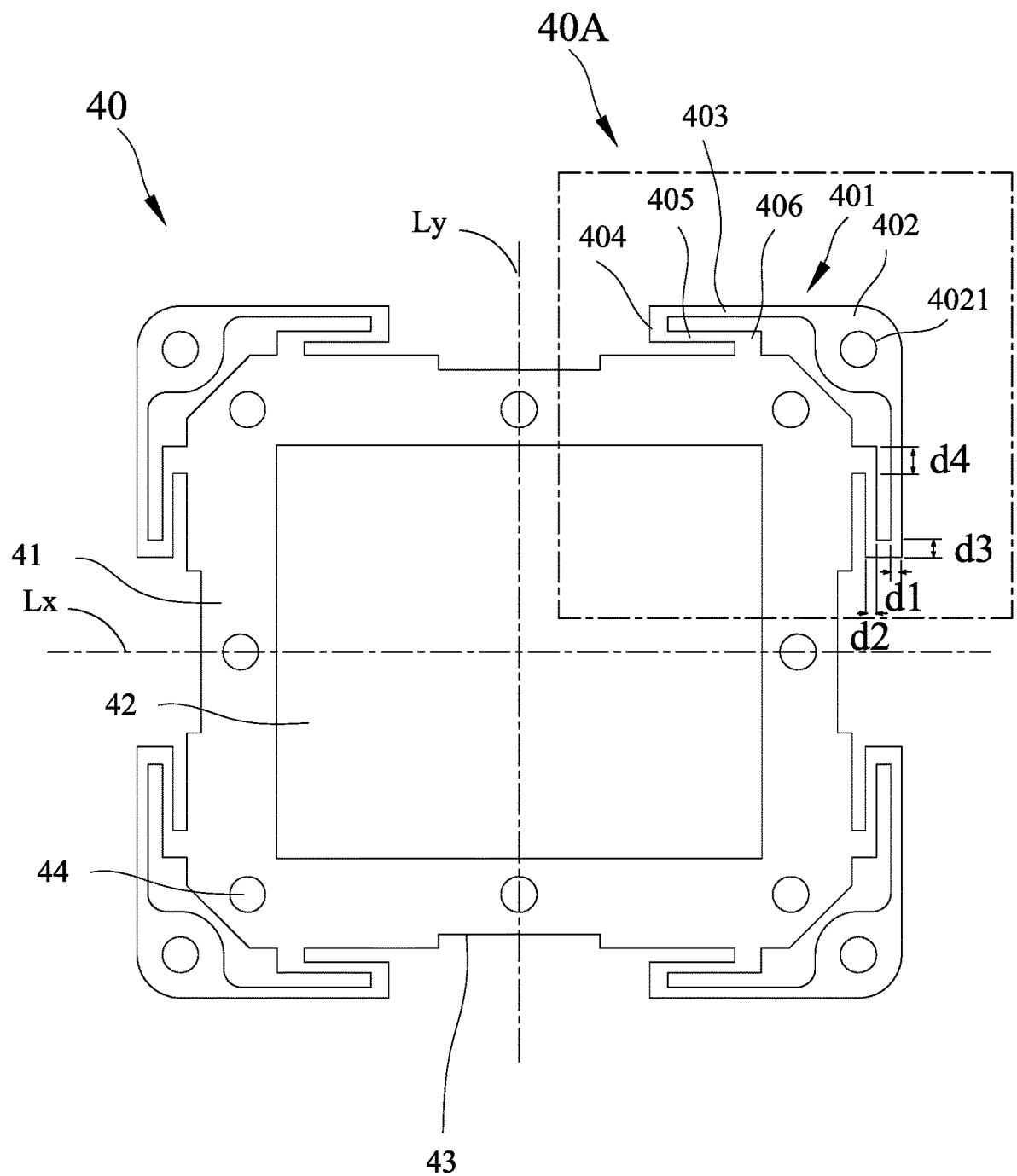
FIG. 4 is a plan view illustrating a structure of an elastic suspension plate according to the present invention.
Figure 5:
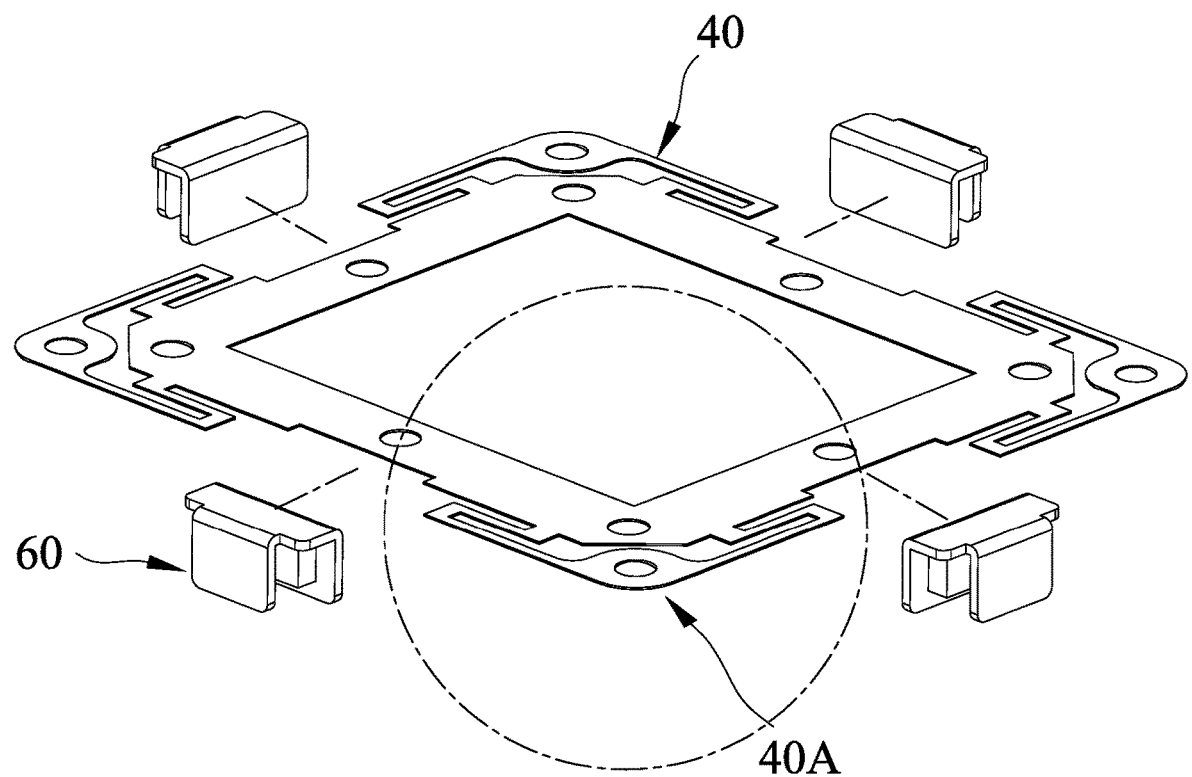
FIG. 5 is a schematic view illustrating operation of the elastic suspension plate according to the present invention.
Figure 5A:
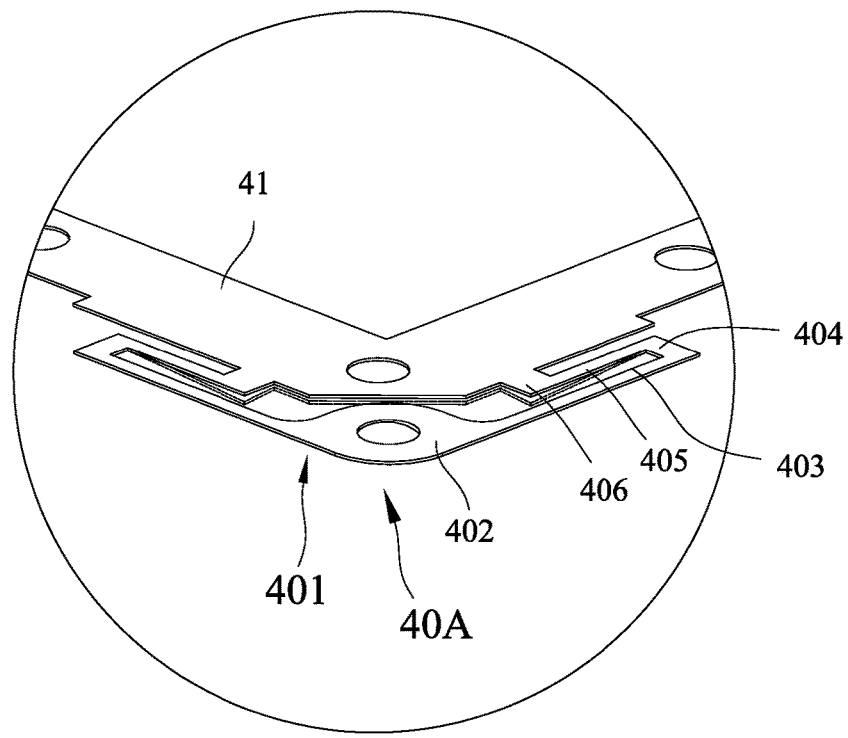
FIG. 5A is an enlarged view of a circled portion 5A of FIG. 5.
Figure 8:
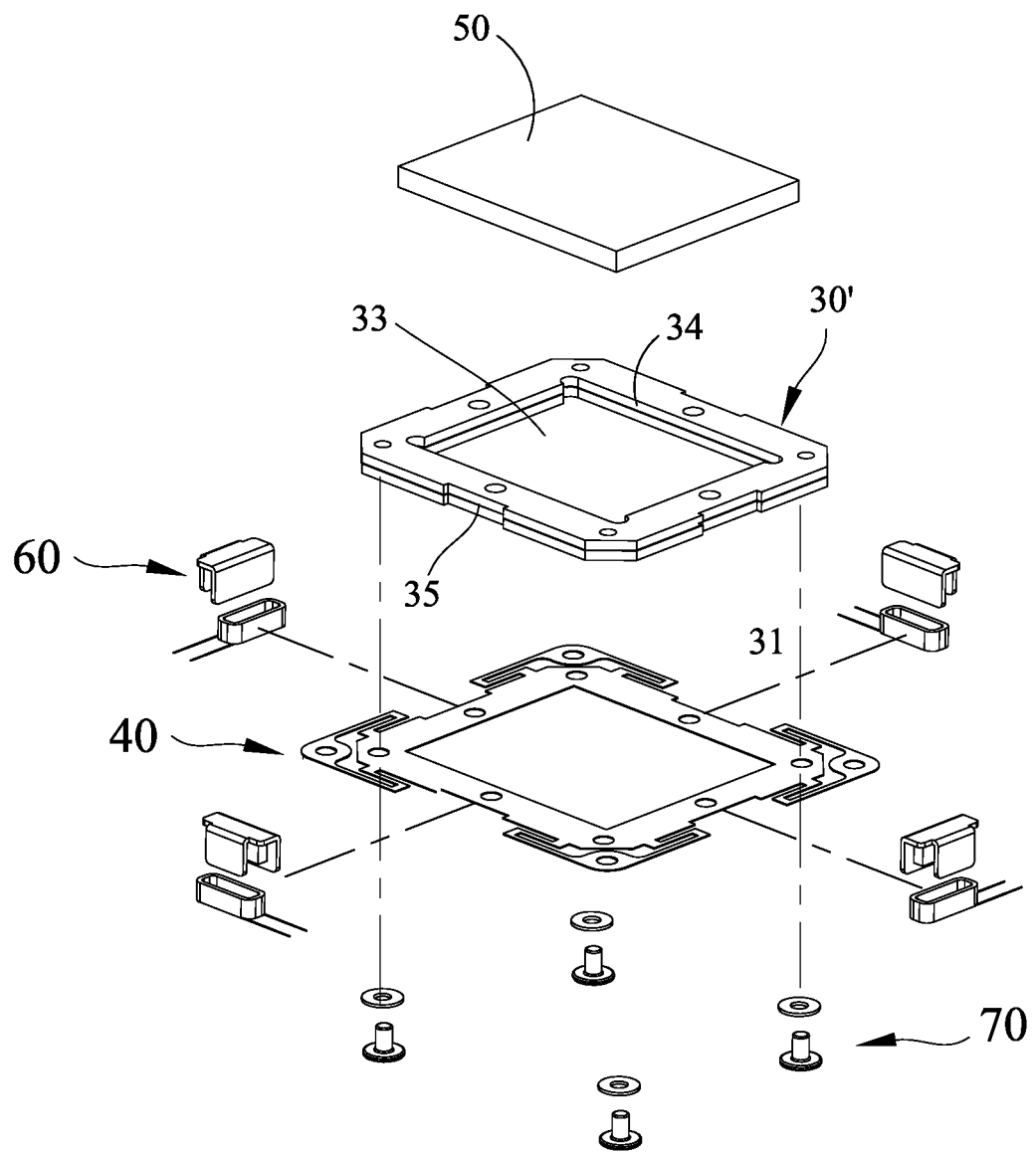
FIG. 8 is a schematic view illustrating the elastic suspension plate combined with the carrier according to another embodiment of the present invention.

Referring to FIGS. 1 and 2, an example of application of a suspension system of a biaxial optical actuator according to the present invention is shown, comprising, at least:

a base 10, wherein the base 10 is formed, in a central area thereof, with a square or rectangular light transmission opening 11 and the light transmission opening 11 has four peripheral sides each formed, in a middle, bisecting point thereof, with a magnet receiving hole 12;

a circuit board 20, which is formed, in a central area thereof, with a light transmission opening 21, wherein the light transmission opening 21 has four peripheral sides, which respectively correspond to the sides of the light transmission opening 11 of the base 10 and the four peripheral sides of the light transmission opening 21 are each formed, in a middle, bisecting point thereof, with magnet receiving hole 22; the circuit board 20 is further formed with a plurality of penetration holes 23 and the penetration holes 23 are provided for avoiding extension of other parts (such fastening bolts) therethrough, wherein in the instant embodiment, the penetration holes 23 are respectively arranged to extend diagonally in four diagonal corners of the light transmission opening 11; and the circuit board 20 is arranged on a carrying surface of the base 10;

an oscillation member 30, which, as shown in FIGS. 1 and 3, comprises a top seat 31 and a bottom seat 32, wherein the top seat 31 and a bottom seat 32 are each an annular structure having a central area formed with a square or rectangular central hole 311, 321 and a magnet accommodation notch 312, 322 is formed in each of four peripheral sides of the central hole 311, 321 at a middle, bisecting point; the central hole 311 of the top seat 31 is greatly than the central hole 321 of the bottom seat 32 and the two central holes 311, 321 are arranged to form therebetween a stepped lens retention trough 34 (as shown in FIGS. 1 and 8) to receive and hole an optical lens 50 positioned therein; and an elastic suspension plate 40, which as shown in FIGS. 3 and 4, comprises a frame body 41, wherein the frame body 41 is formed with a plurality of fastening holes 44 and has four peripheral sides each formed with a magnet accommodation notch 43 at a location corresponding to a central, bisecting line; the frame body 41 is formed, in a central area thereof, with a light transmission opening 42 and the frame body 41 has four corners each forming an elastic unit 40A, wherein the elastic unit 40A comprises an outer flange frame 401 that is formed as an outer circumference thereof in the form of an angled section of 90 degrees with a support handle 402 formed in a middle thereof, the support handle 402 being formed with a mounting hole 4021, and the outer flange frame 401 is structured to extend from two opposite sides of the support handle 402 along each of two adjacent ones of the four peripheral sides of the frame body 41 to form a first cantilever arm 403, the first cantilever arm 403 having an end that is folded inward by 90 degrees to form a curved section 404 having a section extending parallel to the first cantilever arm 403 to form a second cantilever arm 405, the second cantilever arm 405 has an end that is provided, in an inward direction, with a connection arm 406, the connection arm 406 being connected to the frame body 41.

Continuing with the description given above, the first cantilever arm 403 has a length L2 that is greater than a length L3 of the second cantilever arm 405 and thus possesses better elasticity. In a preferred embodiment of the present invention, the first cantilever arm 403 has a width D1 that is identical the a width D2 of the second cantilever arm 405, and the width D1 of the entirety of the first cantilever arm 403 and the width D2 of the entirety of the second cantilever arm 405 are each kept constant and are identical to each other. In other words, the first cantilever arm 403 and the second cantilever arm 405 are cantilever arms of identical cross-sectional size or diameter. However, if necessary in consideration of forces acting thereon, the first cantilever arm 403 and the second cantilever arm 405 can be designed to have different widths or different cross-sectional sizes or different diameters. However, this is a modification required for supporting forces and is generally irrelevant in structural features of this invention so that additional description will not be provided. Further, the curved section 404 and the connection arm 406 have width D3, D4 that may be made greater than the widths D1, D2 of the first cantilever arm 403 and the second cantilever arm 405 and as such, better support and better fatigue strengths are provided; alternatively, the widths D3, D4 of the curved section 404 and the connection arm 406 may be made smaller than the widths D1, D2 of the first cantilever arm 403 and the second cantilever arm 405 and as such, better elasticity may be achieved. This can be adjusted or selected according to materials involved, and this is obvious variation or modification considering the forces that the material must undertake and is generally irrelevant in structural features of this invention so that additional description will not be provided.

Referring to FIGS. 1, 2, 3, and 4, four magnetic devices 60 are respectively set at middle portions of four external side edges of the oscillation member 30, wherein the magnet accommodation notches 312, 322 of the oscillation member 30, the magnet receiving holes 12 of the base 10, the magnet receiving holes 22 of the circuit board 20, and the magnet accommodation notches 43 of the elastic suspension plate 40 are arranged to correspond, in position, to each other in order to receive the four magnetic devices 60 to positioned therein to apply an electromagnetic force to control a movement of the oscillation member 30 in a short distance. Since the four magnetic devices 60 are set at the middle portions of the four external side edges of the oscillation member 30, two imaginary connection lines each connecting between the middles of two opposite ones of the four external side edges of the elastic suspension plate 40 (namely a connection line between bisection points two opposite ones of the magnetic devices 60) are two virtual rotation axis lines Lx, Ly of the oscillation member 30.

Referring to FIGS. 1, 2, and 3, the elastic suspension plate 40 is arranged between the top seat 31 and a bottom seat 32 of the oscillation member 30 and first fixation assemblies 70 are applied to couple the elastic suspension plate 40 and the oscillation member 30 to each other. Second fixation assemblies 71 are respectively set through the support handles 402 that are located at the outmost ends of the elastic suspension plate 40 (namely the four corners) and extend through the penetration holes 23 of the circuit board 20 and also hollowed support posts 711 to fasten to the base 10 so as to allow the elastic suspension plate 40 to drive the oscillation member 30 to oscillate.

Figure 6A:
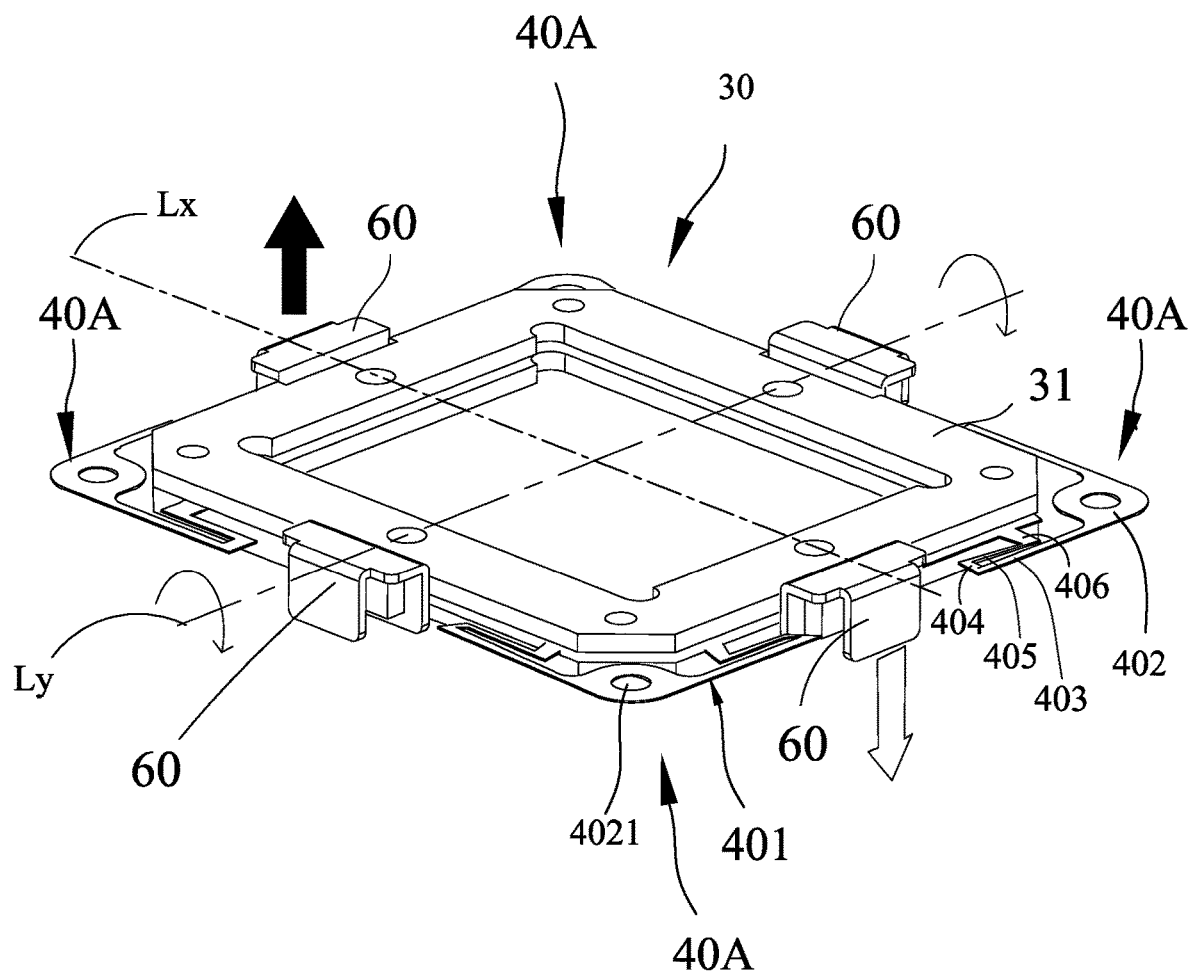
FIG. 6A is a schematic view illustrating the elastic suspension plate driving a carrier to oscillate according to the present invention.
Figure 6B:
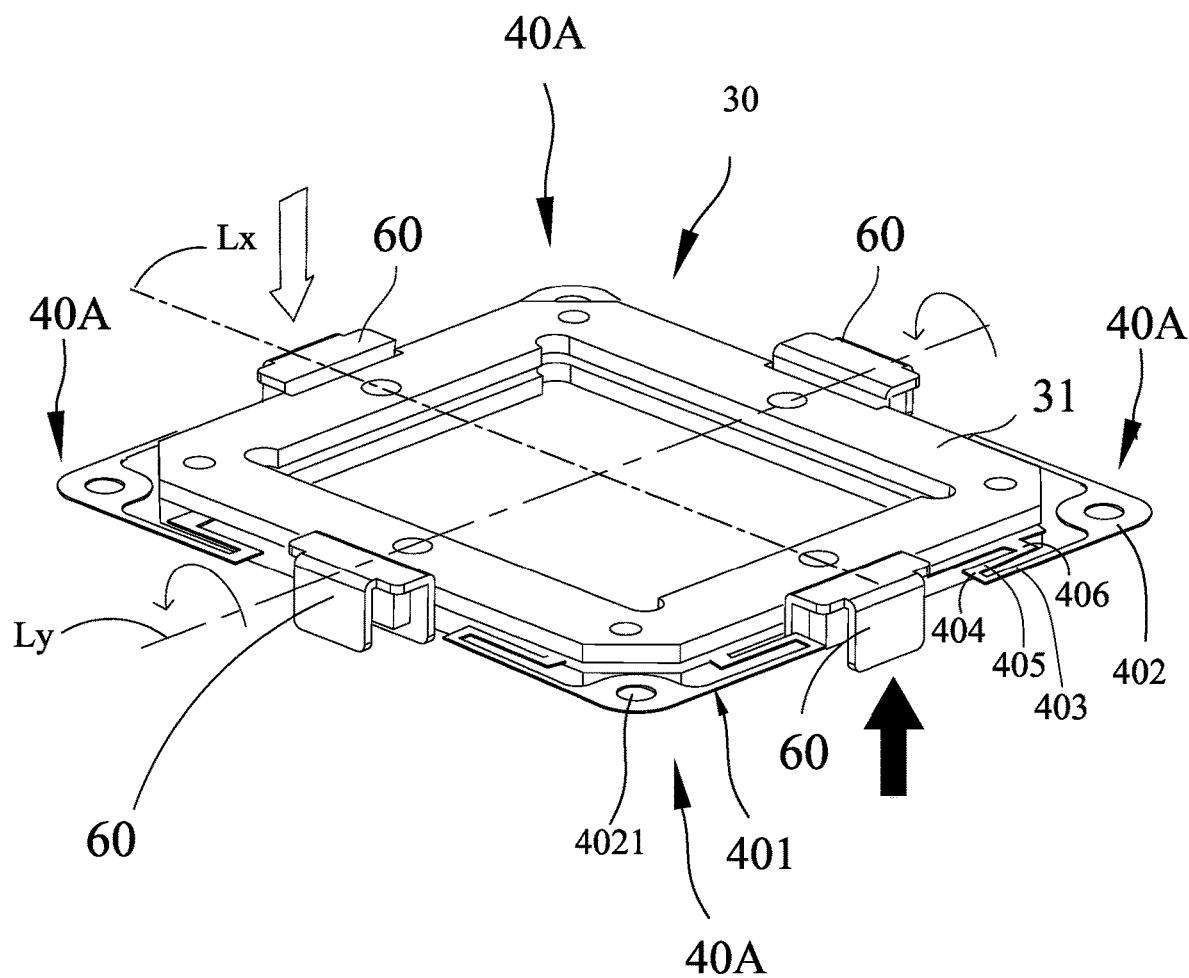
FIG. 6B is another schematic view illustrating the elastic suspension plate driving the carrier to oscillate according to the present invention.

To use the present invention, as shown in FIGS. 1, 5, 6A, and 7, the four elastic unit 40A of the elastic suspension plate 40 are arranged to project beyond and located outside the oscillation member 30 and the support handles 402 that are located at outermost positions may be serve as support points, which, collaborating with the support posts 711, support the elastic suspension plate 40 and the oscillation member 30 at a location above the base 10 and the circuit board 20. The four magnetic devices 60 are operable to each apply a magnetic attraction force at different time points to attract a corresponding side of the plate, of which an operation will be described below with first reference to FIG. 6A. Taking the rotation axis line Ly as a center, a clockwise rotation would cause the portion or the side indicated by the hollow arrow shown in FIG. 6A to be attracted downward by the magnetic devices 60 and in the two elastic units 40A associated with the portion or the side, the second cantilever arms 405 and the connection arms 406 on the two outermost sides are attracted by the magnetic force to move downward and a spring force is generated with respect to the curved sections 404 and the first cantilever arms 403; at the same time, for the magnetic devices 60 on the opposite side and indicated by the solid arrow are such that the elastic units 40A on the two sides are caused to have the second cantilever arms 405 and the connection arms 406 on the outermost sides are acted upon by the magnetic force to move upward and a spring force is generated with respect to the curved sections 404 and the first cantilever arms 403. On the other hand, if the rotation axis line Ly is taken as a center, a counterclockwise rotation would cause the left hand side (indicated by the hollow arrow) of FIG. 6B to be attracted downward by the magnetic devices 60 and in the elastic units 40A on the two sides and are attracted downward by the magnetic devices 60, the second cantilever arms 405 and the connection arms 406 on the outermost two sides of are caused by the magnetic force to move downward and spring force is generated with respect to the curved sections 404 and the first cantilever arms 403; at the same time, for the magnetic devices 60 on the opposite side and indicated by the solid arrow are such that the elastic units 40A on the two sides are caused to have the second cantilever arms 405 and the connection arms 406 on the outermost sides are acted upon by the magnetic force to move upward and a spring force is generated with respect to the curved sections 404 and the first cantilever arms 403.

Figure 7A:
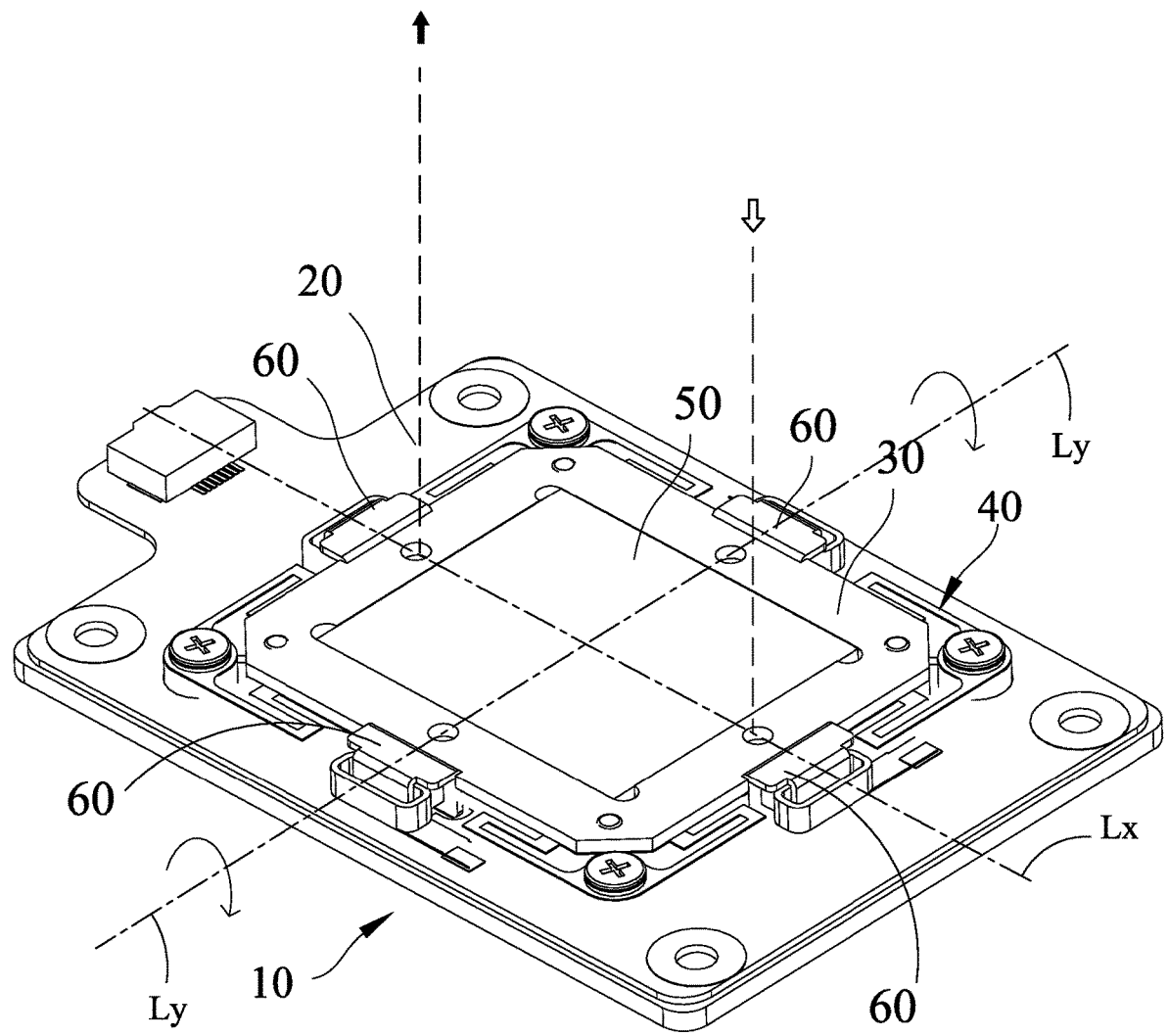
FIG. 7A is a schematic view illustrating an operation of the example of application according to the present invention.
Figure 7B:
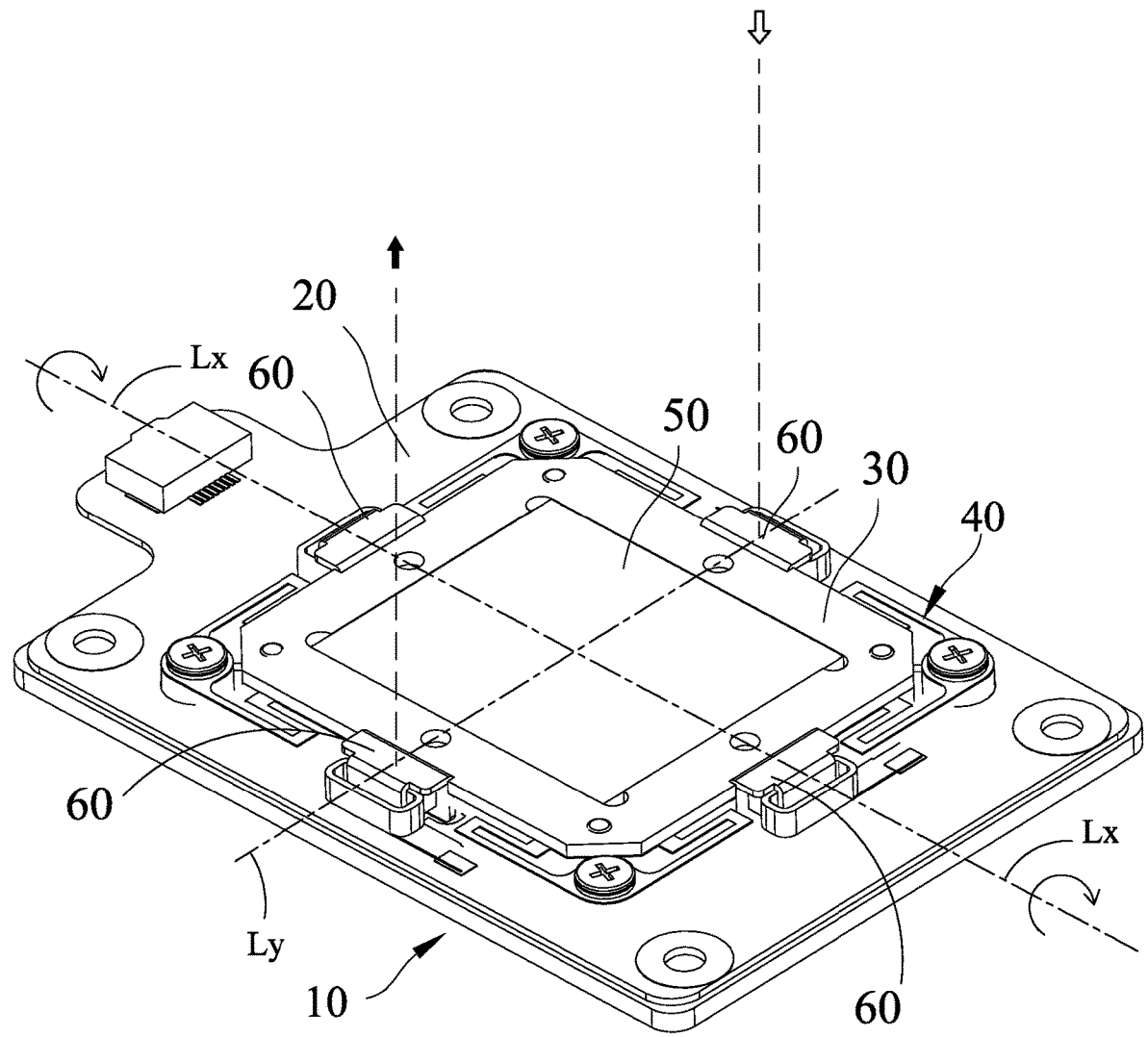
FIG. 7B is another schematic view illustrating an operation of the example of application according to the present invention.
Figure 7C:
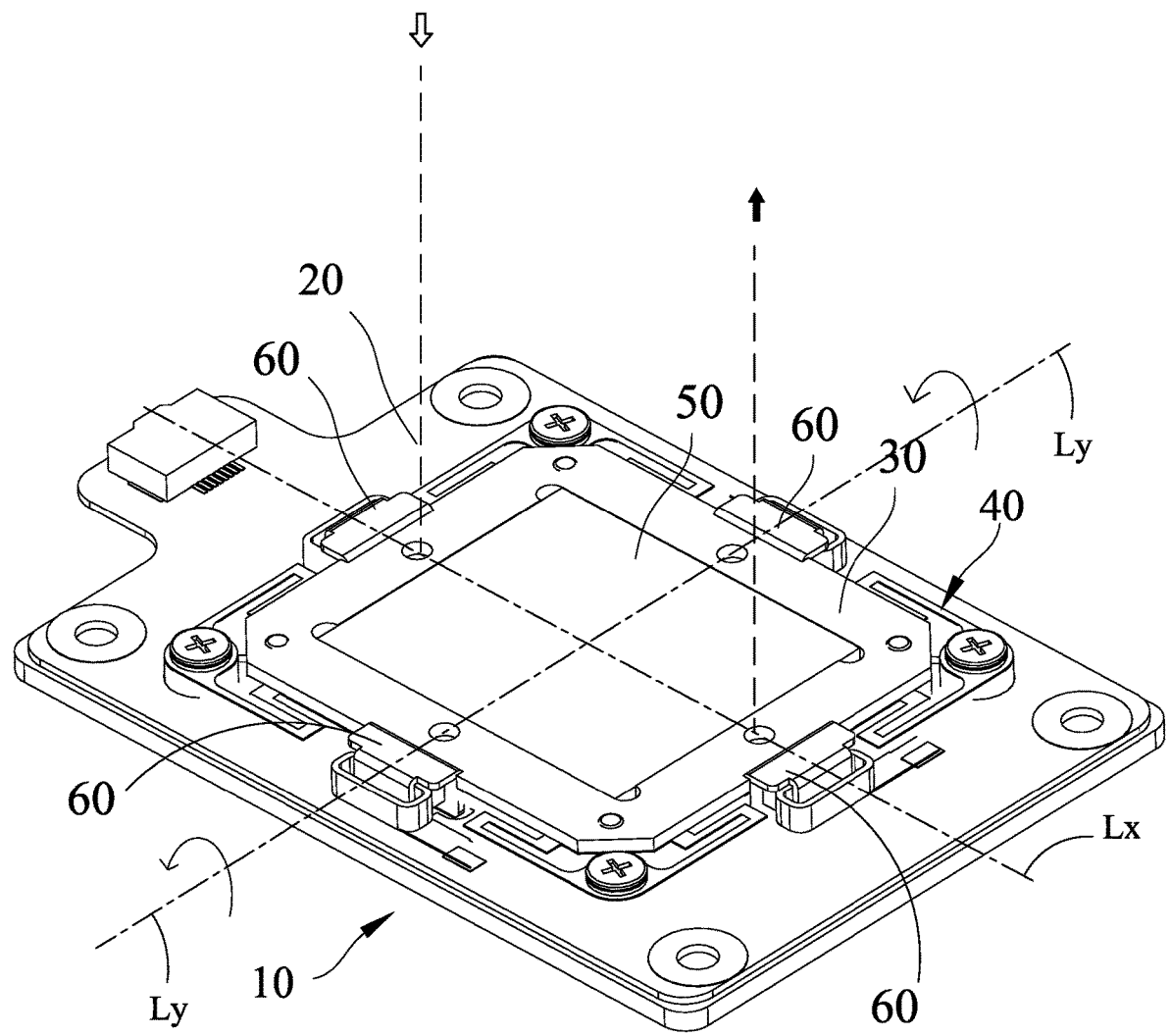
FIG. 7C is a further schematic view illustrating an operation of the example of application according to the present invention.
Figure 7D:
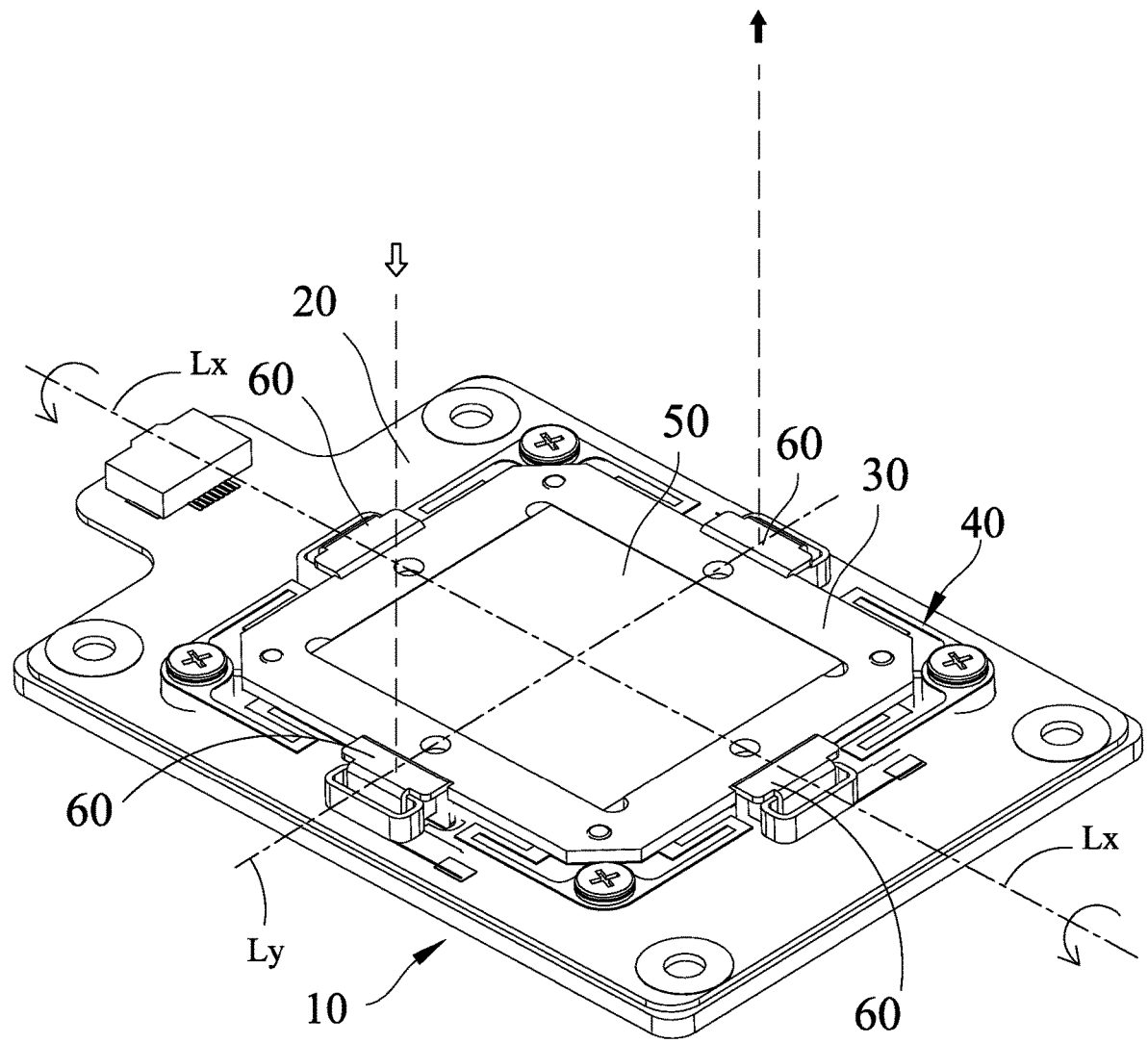
FIG. 7D is a further schematic view illustrating an operation of the example of application according to the present invention.

Thus, in an example of an operation of the entire device of the present invention can be decomposed into for portions, which are (1) as shown in FIG. 7A, a clockwise rotation about the rotation axis line Ly to allow the oscillation member 30 to carry the optical lens 50 to deflect downward in a direction toward the magnetic device 60 rightward of the rotation axis line Ly to be positioned there; (2) as shown in FIG. 7B, a clockwise rotation about the rotation axis line Lx to allow the oscillation member 30 to carry the optical lens 50 to deflect downward in a direction toward the magnetic device 60 rightward of the rotation axis line Lx to be positioned there; (3) as shown in FIG. 7C, a counterclockwise rotation about the rotation axis line Ly to allow the oscillation member 30 to carry the optical lens 50 to deflect downward in a direction toward the magnetic device 60 leftward of the rotation axis line Ly to be positioned there; and (4) as shown in FIG. 7D, a counterclockwise rotation about the rotation axis line Lx to allow the oscillation member 30 to carry the optical lens 50 to deflect downward in a direction toward the magnetic device 60 leftward of the rotation axis line Lx to be positioned there. Thus, when the four magnetic devices 60 take turns to change the direction of the magnetic force, the elastic suspension plate 40 and the oscillation member 30 that carries the optical lens 50 thereon are caused to move through rotation about centers defined by the two rotation axis lines Lx, Ly for specific displacements at specific time points and intervals so that projection light may be modulated and controlled by the actuator to generate light spots at for different locations, making a great increase of the resolution of image projection.

In the example shown in FIG. 3 of the present invention, the oscillation member 30 is made up of a top seat 31 and a bottom seat 32 with the elastic suspension plate 40 fit in between. As an equivalent arrangement, the top seat 31 and the bottom seat 32 of the oscillation member 30 may be integrally formed as a unitary structure with the elastic suspension plate 40 being embedded or fit in a middle plane of the oscillation member 30. FIG. 8 provides an alternative having a simplified structure, in which an integrally formed, unitary oscillation member 30' is provided, in a central area thereof with a central hole 33 that has a lens retention trough 34 to receive and carry the optical lens 50 and four peripheral sides thereof are similarly provided with magnet accommodation notches 35, wherein the elastic suspension plate 40 is fixed by first fixation assemblies 70 under the oscillation member 30'. This provides a simple way of assembly.

Figure 9:
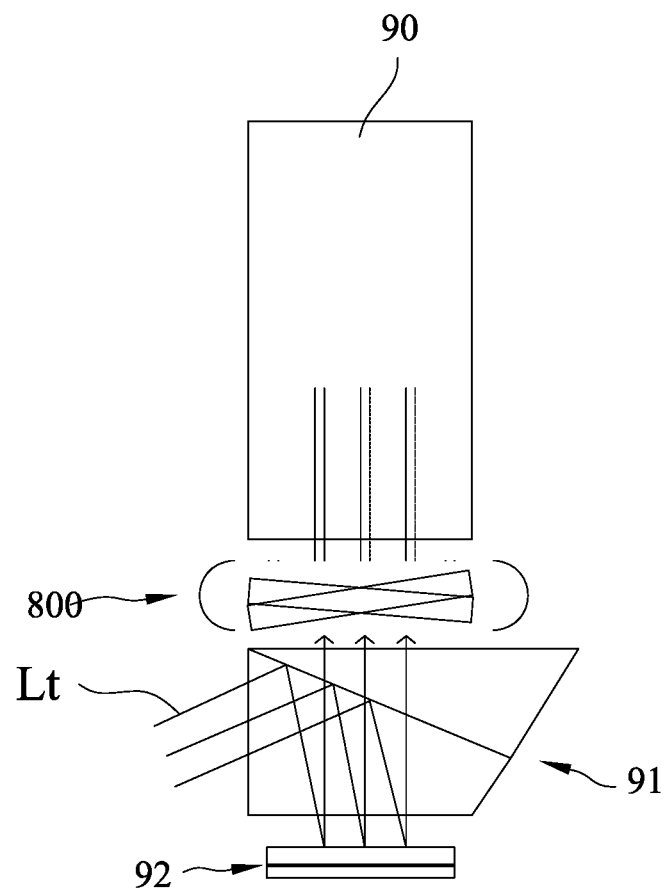
FIG. 9 is a schematic view illustrating an example of use according to the present invention.
Figure 10:
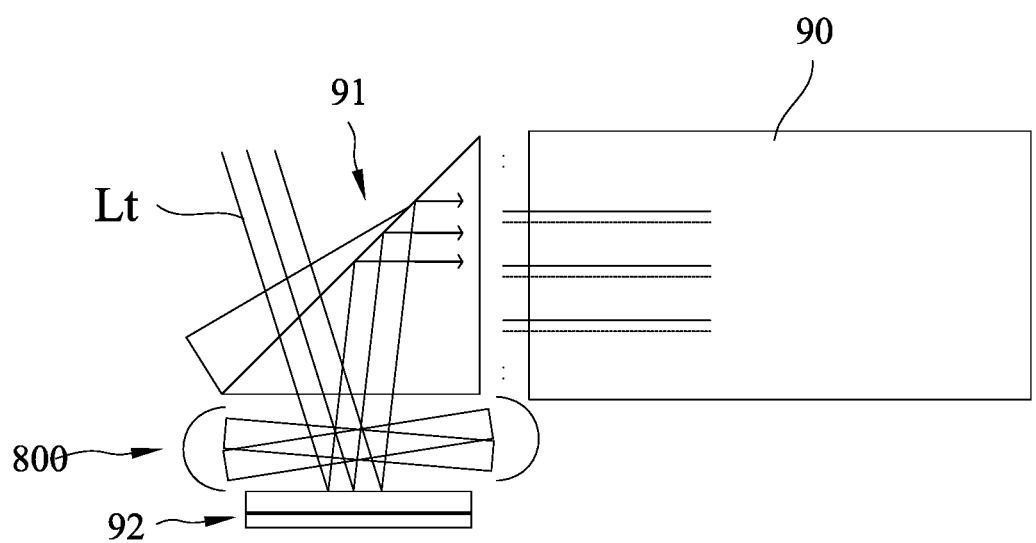
FIG. 10 is another schematic view illustrating the example of use according to the present invention.
Figure 11:
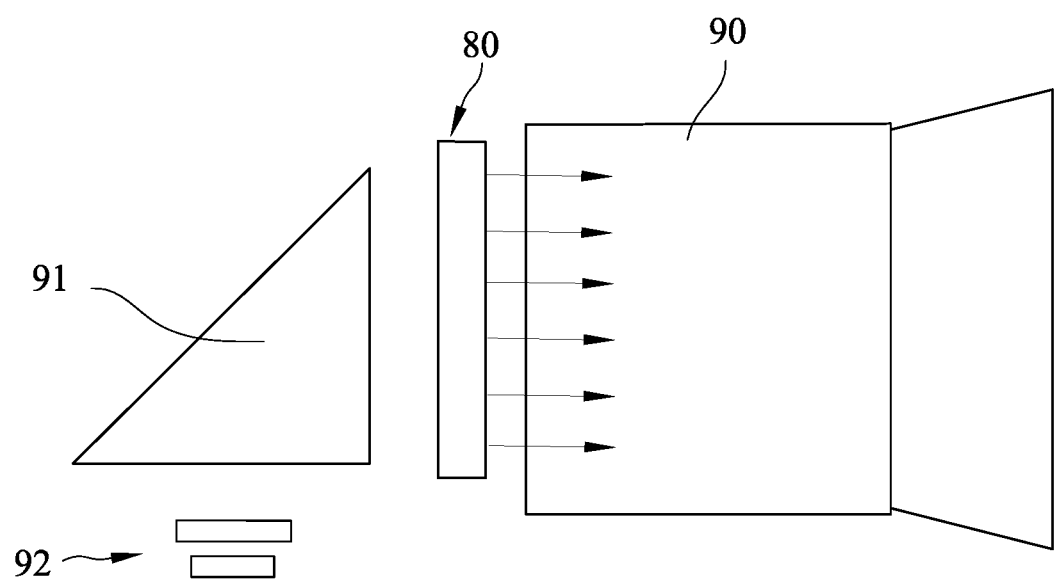
FIG. 11 is a schematic view illustrating the use of an optical actuator.
Figure 12:
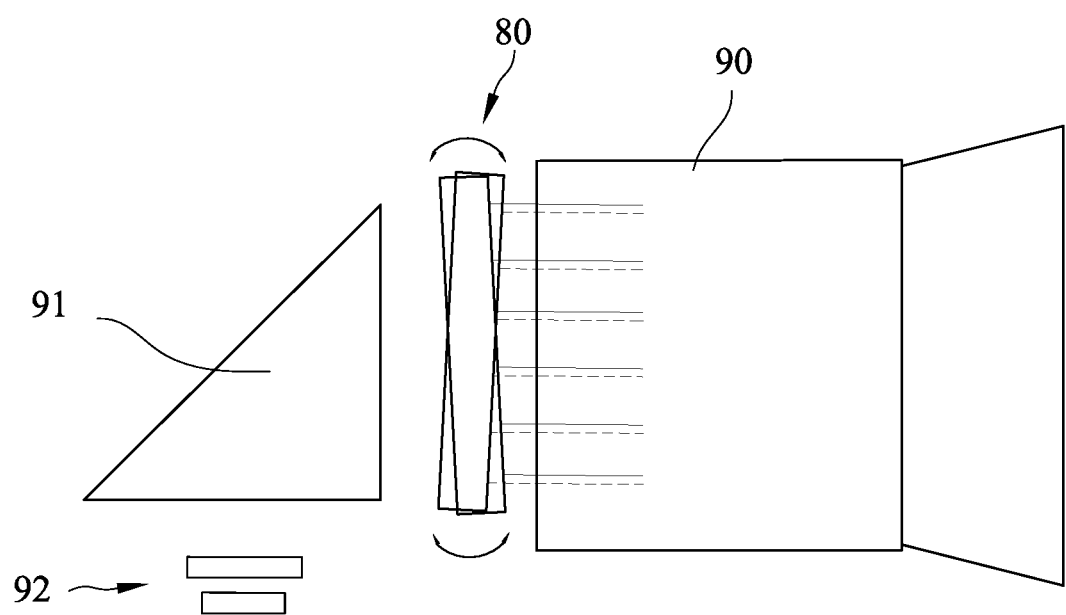
FIG. 12 is another schematic view illustrating the use of the optical actuator.
Figure 13:
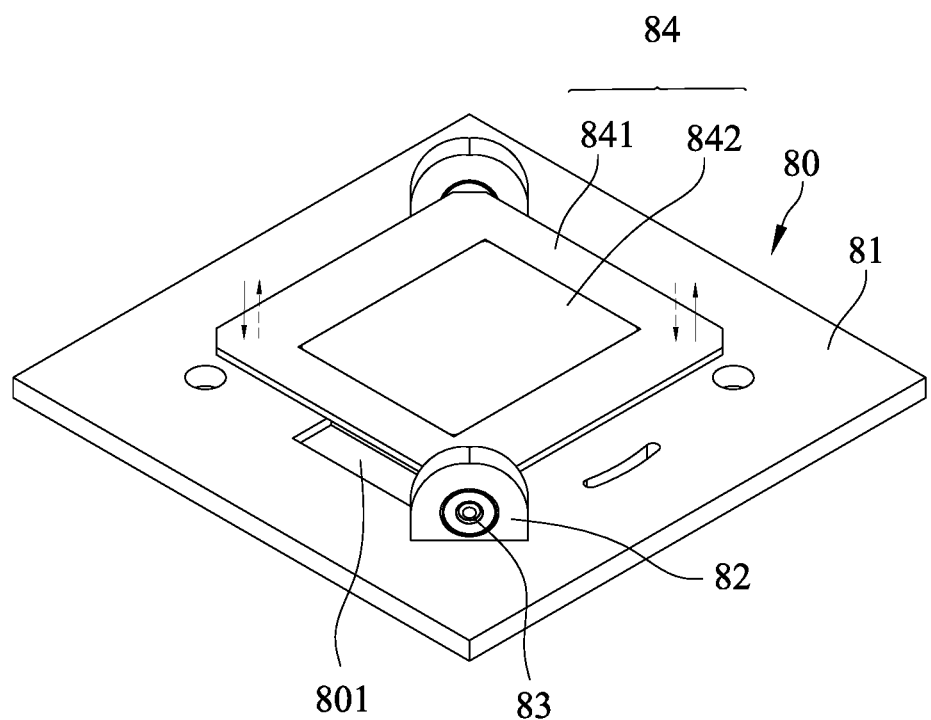
FIG. 13 is a perspective view illustrating a structure of a conventional single-axis optical actuator.
Figure 14:
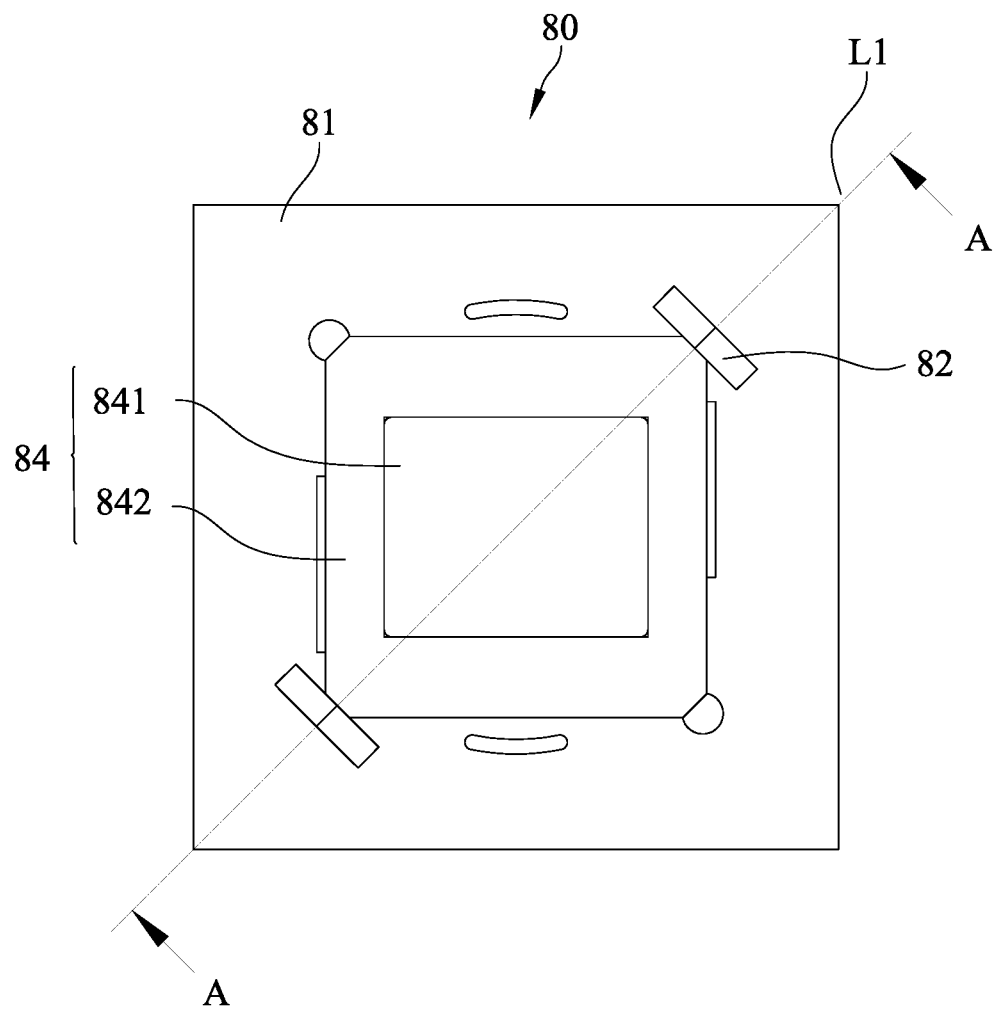
FIG. 14 is a plan view of the arrangement shown in FIG. 11.
Figure 15:
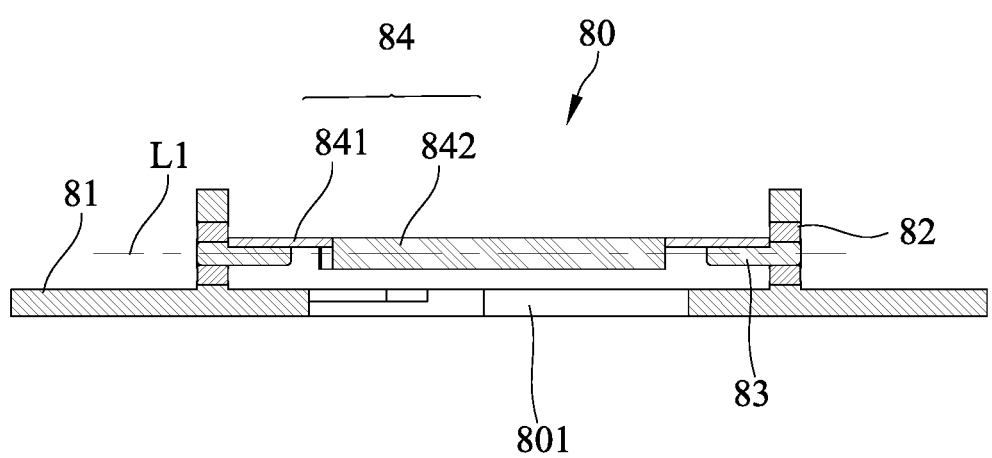
FIG. 15 is a cross-sectional view taken along line A-A of FIG. 12.

The present invention can be widely used in various applications, other than those shown in FIGS. 11 and 12. In the application shown in FIG. 9, an actuator 800 according to the present invention as described above is arranged such that image light Lt is allowed to travel through a prism 91 and a micro chip board 92 (such as DMD) to then allow the actuator 800 according to the present invention to deflect, in a quick manner, the light toward different angles for directly projecting onto a projection curtain (not shown) associated with a lens 90. Alternatively, in the application shown in FIG. 10, image light Lt travels through a prism 91 and a micro chip board 92 (such as DMD) to then allow the actuator 800 according to the present invention to deflect the light toward different angles to be then reflected by the prism 91 to project onto a projection curtain (not shown) associated with a lens 90. These different forms are perfectly suitable for application of the present invention.

The present invention provides the following advantages:

(1) The present invention is applicable to a biaxial optical actuator and provides a great improvement of resolution as compared to the conventional single-axis two-point based operation mode.

(2) The suspension system of the present invention includes an ingenious elaborate elastic unit at each of four corners of a large span of elastic suspension plate so as to allow the optical actuator to conduct displacements at the four corners with high accuracy.

(3) The present invention uses an elastic suspension plate that is formed through stamping of a large piece of metal so that the manufacturing is easy and assembly is also easy and efficient, and can be used easily in combination with an oscillation member with advantages of easy positioning for replacement, occupying less space, and thus helpful for warehousing management.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A biaxial optical actuator suspension system, comprising, at least:
   a base, which is formed, in a central area thereof, with a light transmission opening;
   a circuit board, which is formed, in a central area thereof, with a light transmission opening corresponding to the base;
   an oscillation member, which comprises an annular structure having a square central hole formed in a central portion thereof, the central hole having sides that form a stepped lens retention trough to receive and hold an optical lens positioned therein;
   an elastic suspension plate, which comprises a frame body, a light transmission opening being formed in a central area of frame body, an elastic unit being formed at each of four corners of the frame body, each of the elastic units comprising a curved outer flange frame, which has a middle portion that forms a support handle, the outer flange frame being extended from the support handle to form first cantilever arms respectively extending along two peripheral sides of the frame body, each of the first cantilever arms having an end that is folded inward to form a curved section that comprises a section extending parallel to the first cantilever arm to form a second cantilever arm, the second cantilever arm having an end that is provided, in an inward direction, with a connection arm, the connection arm being connected to the frame body; and
   four magnetic devices, which are respectively set at four external side edges of the oscillation member to control a movement of the oscillation member with an electromagnetic force, wherein the magnetic devices are arranged in pairs each of which includes two of the four magnetic devices that are opposite to each other and define therebetween a rotation axis line of the oscillation member; the elastic suspension plate, first fixation assemblies fixing the elastic suspension plate and the oscillation member together; second fixation assemblies are received through the support handles that are located at outermost portions of the elastic suspension plate and extend through the circuit board and support posts to be fastened to the base, so as to allow the elastic suspension plate to drive the oscillation member, as being acted upon by the magnetic devices, to undertake oscillation in a multiple-point positioning manner.

2. The biaxial optical actuator suspension system according to claim 1, wherein the first cantilever arms of the elastic units have a length that is greater than a length of the second cantilever arms.

3. The biaxial optical actuator suspension system according to claim 1, wherein the first cantilever arms of the elastic units have a width that is identical to a width of the second cantilever arms.

4. The biaxial optical actuator suspension system according to claim 1, wherein the first cantilever arms and the second cantilever arms of the elastic unit are cantilever arms of the same diameter.

5. The biaxial optical actuator suspension system according to claim 1, wherein the first cantilever arms and the second cantilever arms of the elastic unit are cantilevers of different diameters.

6. The biaxial optical actuator suspension system according to claim 1, wherein the curved sections and the connection arms of the elastic units have widths that are greater than widths of the first cantilever arms and the second cantilever arms.

7. The biaxial optical actuator suspension system according to claim 1, wherein the curved sections and the connection arms of the elastic units have widths that are not greater than widths of the first cantilever arms and the second cantilever arms.

8. The biaxial optical actuator suspension system according to claim 1, wherein the oscillation member comprises a top seat and a bottom seat and the elastic suspension plate is interposed between the top seat and the bottom seat.

9. The biaxial optical actuator suspension system according to claim 1, wherein the oscillation member comprises a unitary structure and the elastic suspension plate is embedded in a central plane of the oscillation member.

10. The biaxial optical actuator suspension system according to claim 1, wherein the oscillation member comprises a unitary structure and the elastic suspension plate is mounted under the oscillation member.

11. The biaxial optical actuator suspension system according to claim 1, wherein the outer flange frames of the elastic units are bent by 90 degrees.

12. The biaxial optical actuator suspension system according to claim 1, wherein the first cantilever arms, the curved sections, the second cantilever arms, and the connection arms that are extended from two opposite sides of the outer flange frame of the elastic unit and are connected together in a 90-degree bending configuration.

13. The biaxial optical actuator suspension system according to claim 1, wherein the four magnetic devices are respectively set at middles of the four external side edges of the oscillation member.

* * * * *